United States Patent
Abdelghaffar et al.

(10) Patent No.: US 11,764,918 B2
(45) Date of Patent: Sep. 19, 2023

(54) CARRIER GROUP BASED MIMO LAYERS AND ANTENNA ADAPTATION

(71) Applicant: QUALCOMM Incorporated, San Diego, CA (US)

(72) Inventors: Muhammad Sayed Khairy Abdelghaffar, San Jose, CA (US); Wooseok Nam, San Diego, CA (US); Peter Pui Lok Ang, San Diego, CA (US); Tao Luo, San Diego, CA (US); Huilin Xu, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/061,316

(22) Filed: Oct. 1, 2020

(65) Prior Publication Data

US 2021/0105108 A1    Apr. 8, 2021

Related U.S. Application Data

(60) Provisional application No. 62/911,064, filed on Oct. 4, 2019.

(51) Int. Cl.
*H04L 5/00* (2006.01)
*H04B 7/0413* (2017.01)
(Continued)

(52) U.S. Cl.
CPC ......... *H04L 5/0032* (2013.01); *H04B 7/0413* (2013.01); *H04W 72/51* (2023.01)

(58) Field of Classification Search
CPC ... H04L 5/0032; H04B 7/0413; H04W 72/048
(Continued)

(56) References Cited

U.S. PATENT DOCUMENTS

2010/0272051 A1\* 10/2010 Fu .................. H04L 5/0046
370/329
2018/0262905 A1\* 9/2018 Dhanapal ............ H04W 8/24
(Continued)

FOREIGN PATENT DOCUMENTS

CN    112399569 A    2/2021
EP    3683997 A1 \*  7/2020  ........... H04B 7/0413
(Continued)

OTHER PUBLICATIONS

Intel Corporation, "NR MIMO layer configuration", R4-1814549, 3GPP TSG-RAN WG4 Meeting #89, Spokane USA, Nov. 12-16, 2018 (Year: 2018).\*
(Continued)

*Primary Examiner* — Kwang B Yao
*Assistant Examiner* — Xuan Lu
(74) *Attorney, Agent, or Firm* — Patterson + Sheridan, LLP

(57) ABSTRACT

Certain aspects of the present disclosure provide techniques for carrier group based multiple-input multiple-output (MIMO) layers and antenna adaptation. A method that may be performed by a user equipment (UE) includes receiving a configuration of one or more groups of component carriers (CCs) and, for each group of CCs, one or more sets of configured maximum number of MIMO layers. Each set includes a configured maximum number of MIMO layers associated with each CC in the group. The UE receives an indication of at least one of the one or more sets and determines the configured maximum number of MIMO layers associated with each CC in the corresponding group of CCs based on the indication.

31 Claims, 12 Drawing Sheets

| CCs in Group | Set 1 | Set 2 | Set 3 | Set 4 |
|---|---|---|---|---|
| CC 1 | 4 | 4 | 2 | 2 |
| CC 2 | 4 | 4 | 2 | 2 |
| CC 3 | 4 | 2 | 4 | 2 |
| CC 4 | 4 | 2 | 4 | 2 |

(51) Int. Cl.
*H04B 7/08* (2006.01)
*H04B 7/06* (2006.01)
*H04W 72/51* (2023.01)

(58) Field of Classification Search
USPC .......................................................... 370/329
See application file for complete search history.

(56) References Cited

U.S. PATENT DOCUMENTS

2020/0221290 A1* 7/2020 Wiemann ................ H04W 8/24
2020/0314748 A1* 10/2020 Kim .................. H04W 52/0206
2021/0377941 A1* 12/2021 Balakrishnan .......... H04L 5/001

FOREIGN PATENT DOCUMENTS

| EP | 3934345 A1 * | 1/2022 |
| WO | WO-2021025362 A1 * | 2/2021 |
| WO | WO-2021027499 A1 * | 2/2021 |
| WO | WO-2021027887 A1 * | 2/2021 |

OTHER PUBLICATIONS

Huawei, HiSilicon, "On UE assistance information", R1-1909309, 3GPP TSG RAN WG1 Meeting #98, Prague, Czech Republic, Aug. 26-30, 2019 (Year: 2019).*

Ericsson, "11.11.4 MIMO layer adaptation", R2-1909987, 3GPP TSG-RAN2 Meeting #107, Prague, Czech Republic, Aug. 26-30, 2019 (Year: 2019).*

Ericsson: "UE Adaptation to Maximum Number of MIMO Layers", 3GPP Draft; 3GPP TSG-RAN2 Meeting #107, {2-1909987, UE Adaptation to Maximum Number of MIMO Layers, 3rd Generation Partnership Project (3GPP), Mobile Competence Centre; 650, Route Des Lucioles; F-06921 Sophia-Antipolis Cedex, vol. RAN WG2, No. Prague, Czech Republic; Aug. 26, 2019-Aug. 30, 2019, Aug. 16, 2019 (Aug. 16, 2019), XP051767773, 10 Pages, Retrieved from the Internet: URL: http://www.3gpp.org/ftp/tsg_ran/WG2_RL2/TSGR2_107/Docs/R2-1909987.zip, Section 2.

Huawei, et al., "On UE Assistance Information", 3GPP Draft; 3GPP TSG RAN WG1 Meeting #98, R1-1909309, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019 (Aug. 17, 2019), XP051765916, 6 Pages, Retrieved from the Internet: URL: http://www.3gpp.org/ftp/tsg_ran/WG1_RL1/TSGR1_98/Docs/R1-1909309.zip, [retrieved on Aug. 17, 2019], Section 2.

Intel Corporation: "NR MIMO Layer Configuration", 3GPP Draft; 3GPP TSG-RAN WG4 Meeting #89, R4-1814549—NR MIMO Layers, 3rd Generation Partnership Project (3GPP), Mobile Competence Centre; 650, Route Des Lucioles; F-06921, Sophia-Antipolis Cedex; France, vol. RAN WG4, No. Spokane, USA, Nov. 12, 2018-Nov. 16, 2018, Nov. 11, 2018 (Nov. 11, 2018), XP051558938, 5 Pages, Retrieved from the Internet: URL: http://www.3gpp.org/ftp/Meetings%5F3GPP%5FSYNC/RAN4/DOCS/R4%2D1814549%2Ezip, [retrieved on Nov. 11, 2018], the whole document.

International Search Report and Written Opinion—PCT/US2020/054090—ISA/EPO—dated Jan. 13, 2021.

* cited by examiner

500

| CCs in Group | Set 1 | Set 2 | Set 3 | Set 4 |
|---|---|---|---|---|
| CC 1 | 4 | 4 | 2 | 2 |
| CC 2 | 4 | 4 | 2 | 2 |
| CC 3 | 4 | 2 | 4 | 2 |
| CC 4 | 4 | 2 | 4 | 2 |

| CCs in Group | Set 1 | Set 2 | Set 3 | Set 4 |
|---|---|---|---|---|
| CC 1 | 4 | 3 | 2 | 1 |
| CC 2 | | | | |
| CC 3 | | | | |
| CC 4 | | | | |

| CCs in Group | BWP 1 | BWP 2 | BWP 3 | BWP 4 |
|---|---|---|---|---|
| CC 1 | 4 | 4 | 2 | 2 |
| CC 2 | 4 | 4 | 2 | 2 |
| CC 3 | 4 | 2 | 4 | 2 |
| CC 4 | 4 | 2 | 4 | 2 |

FIG. 7

CARRIER GROUP BASED MIMO LAYERS AND ANTENNA ADAPTATION

CROSS-REFERENCE TO RELATED APPLICATION(S)

This application claims benefit of and priority to U.S. Provisional Application No. 62/911,064, filed Oct. 4, 2019, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for carrier group based multiple-input multiple-output (MIMO) layers and antenna adaptation.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved antenna adaptation in carrier aggregation (CA) with carrier group based number of layers of multiple-input multiple-output (MIMO) layers and antenna adaptation.

One aspect of the subject matter described in this disclosure can be implemented in a method for wireless communication by a user equipment (UE). The method generally includes receiving a configuration of one or more groups of component carriers (CCs) and, for each group of CCs, one or more sets of configured maximum number of MIMO layers. Each set includes a configured maximum number of MIMO layers associated with each CC in the group. The method generally includes receiving an indication of at least one of the one or more sets and determining the configured maximum number of MIMO layers associated with each CC in the corresponding group of CCs based on the indication.

One aspect of the subject matter described in this disclosure can be implemented in a method for wireless communication by a BS. The method generally includes configuring a UE with one or more groups of CCs and, for each group of CCs, one or more sets of configured maximum number of MIMO layers. Each set includes a configured maximum number of MIMO layers associated with each CC in the group. The method generally includes sending an indication to the UE of at least one of the one or more sets.

One aspect of the subject matter described in this disclosure can be implemented in an apparatus for wireless communication. The apparatus generally includes at least one processor and a memory coupled to the at least one processor. The memory generally includes code executable by the at least one processor to cause the apparatus to receive a configuration of one or more groups of CCs and, for each group of CCs, one or more sets of configured maximum number of MIMO layers. Each set includes a configured maximum number of MIMO layers associated with each CC in the group. The memory generally includes code executable by the at least one processor to cause the apparatus to receive an indication of at least one of the one or more sets and determine the configured maximum number of MIMO layers associated with each CC in the corresponding group of CCs based on the indication.

One aspect of the subject matter described in this disclosure can be implemented in an apparatus for wireless communication. The apparatus generally includes at least one processor and a memory coupled to the at least one processor. The memory generally includes code executable by the at least one processor to cause the apparatus to configure a UE with one or more groups of CCs and, for each group of CCs, one or more sets of configured maximum number of MIMO layers. Each set includes a configured maximum number of MIMO layers associated with each CC in the group. The memory generally includes code executable by the at least one processor to cause the apparatus to send an indication to the UE of at least one of the one or more sets.

One aspect of the subject matter described in this disclosure can be implemented in an apparatus for wireless communication. The apparatus generally includes means for receiving a configuration of one or more groups of CCs and, for each group of CCs, one or more sets of configured maximum number of MIMO layers. Each set includes a configured maximum number of MIMO layers associated with each CC in the group. The apparatus generally includes means for receiving an indication of at least one of the one or more sets. The apparatus generally includes means for determining the configured maximum number of MIMO layers associated with each CC in the corresponding group of CCs based on the indication.

One aspect of the subject matter described in this disclosure can be implemented in an apparatus for wireless communication. The apparatus generally includes means for configuring a UE with one or more groups of CCs and, for each group of CCs, one or more sets of configured maximum number of MIMO layers. Each set includes a configured maximum number of MIMO layers associated with each CC in the group. The apparatus generally includes means for sending an indication to the UE of at least one of the one or more sets.

One aspect of the subject matter described in this disclosure can be implemented in a computer readable medium storing computer executable code thereon for wireless communication. The computer readable medium generally includes code for receiving a configuration of one or more groups of CCs and, for each group of CCs, one or more sets of configured maximum number of MIMO layers. Each set includes a configured maximum number of MIMO layers associated with each CC in the group. The computer readable medium generally includes code for receiving an indication of at least one of the one or more sets. The computer readable medium generally includes code for determining the configured maximum number of MIMO layers associated with each CC in the corresponding group of CCs based on the indication.

One aspect of the subject matter described in this disclosure can be implemented in computer readable medium storing computer executable code thereon for wireless communication. The computer readable medium generally includes code for configuring a UE with one or more groups of CCs and, for each group of CCs, one or more sets of configured maximum number of MIMO layers. Each set includes a configured maximum number of MIMO layers associated with each CC in the group. The computer readable medium generally includes code for sending an indication to the UE of at least one of the one or more sets.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a table showing example configured sets of numbers of MIMO layers for a component carrier (CC) group, in accordance with certain aspects of the present disclosure.

FIG. 6 is a table showing another example configured sets of numbers of MIMO layers for a CC group, in accordance with certain aspects of the present disclosure.

FIG. 7 is a table showing example configured sets of numbers of MIMO layers for different BWPs for a CC group, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
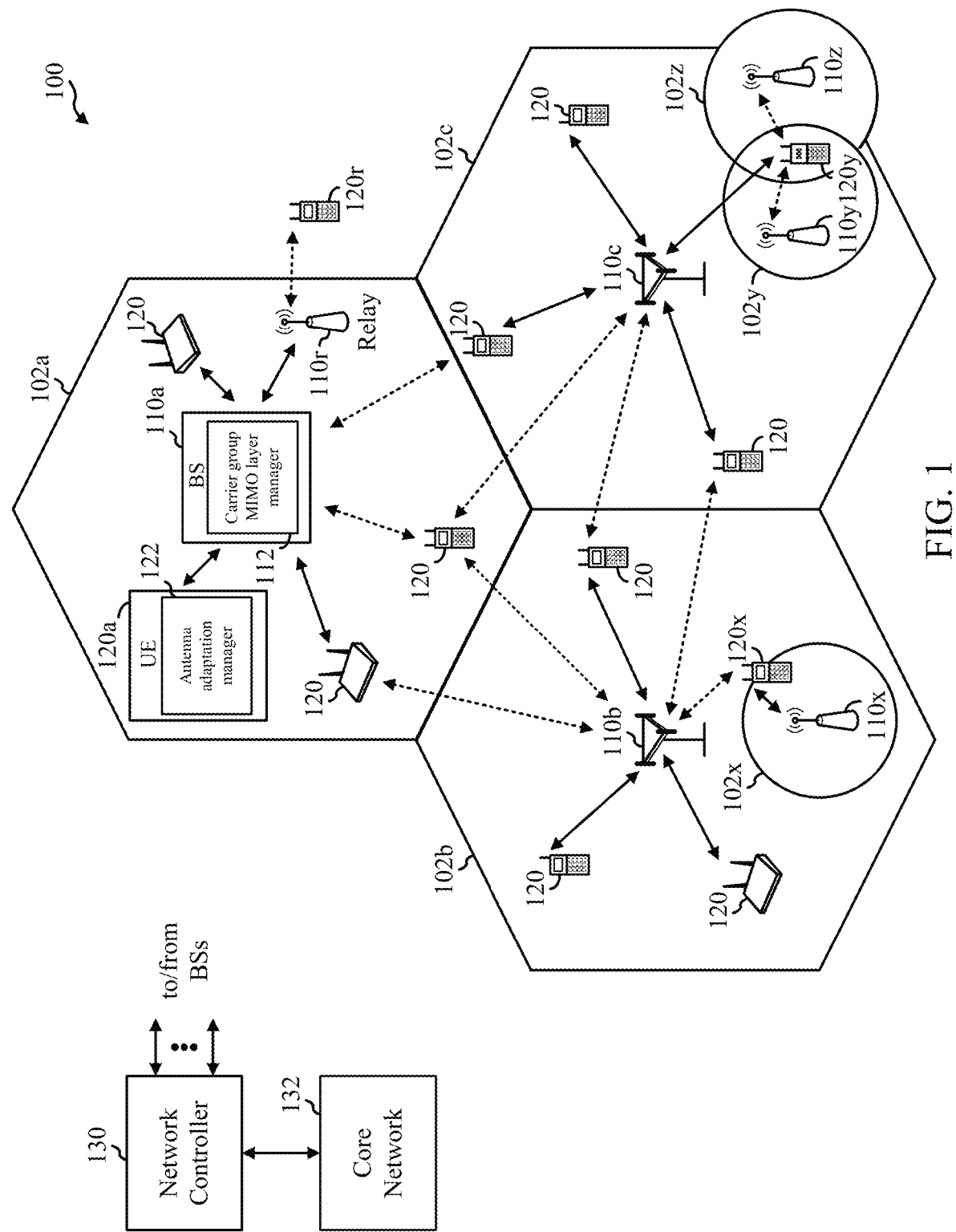
FIG. 1 is a block diagram conceptually illustrating an example telecommunications system, in accordance with certain aspects of the present disclosure.

Aspects of the present disclosure provide apparatus, methods, processing systems, and computer readable mediums for multiple-input multiple-output (MIMO) layer and antenna adaptation, such as carrier group based MIMO layer and antenna adaptation.

In certain systems, such as some new radio systems (e.g., 5G NR systems), user equipment (UE) are configured with a number of MIMO layers per component carrier (CC) and/or per bandwidth part (BWP). The UE can save power by turning off some antennas (e.g., and associated baseband processing) when the UE switches to CCs or BWPs with a lower configured number of MIMO layers.

In certain systems; however, such as carrier aggregation (CA) systems, the UE may have multiple active CCs and/or BWPs that are configured with different numbers of layers. Thus, the UE may not be able to activate/deactivate antennas to utilize the power savings.

Accordingly, aspects of the present disclosure provide techniques and apparatus for a carrier group based MIMO layer configuration and antenna adaptation. The techniques described herein may allow the UE to achieve power savings even with carrier aggregation.

The following description provides examples of carrier group based MIMO layers and antenna adaptation in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for carrier aggregation (CA). As shown in FIG. 1, the BS 110a includes a carrier group MIMO layer manager 112. The carrier group MIMO layer manager 112 may be configured to configure the UE 120a with carrier groups and associated set(s) of numbers of MIMO layers, in accordance with aspects of the present disclosure. As shown in FIG. 1, the UE 120a includes an antenna adaptation manager 122. The antenna adaptation manager 122 may be configured to determine the number of MIMO layers to apply for a carrier group or groups and to active/deactivate antennas based on the determined number of MIMO layers, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
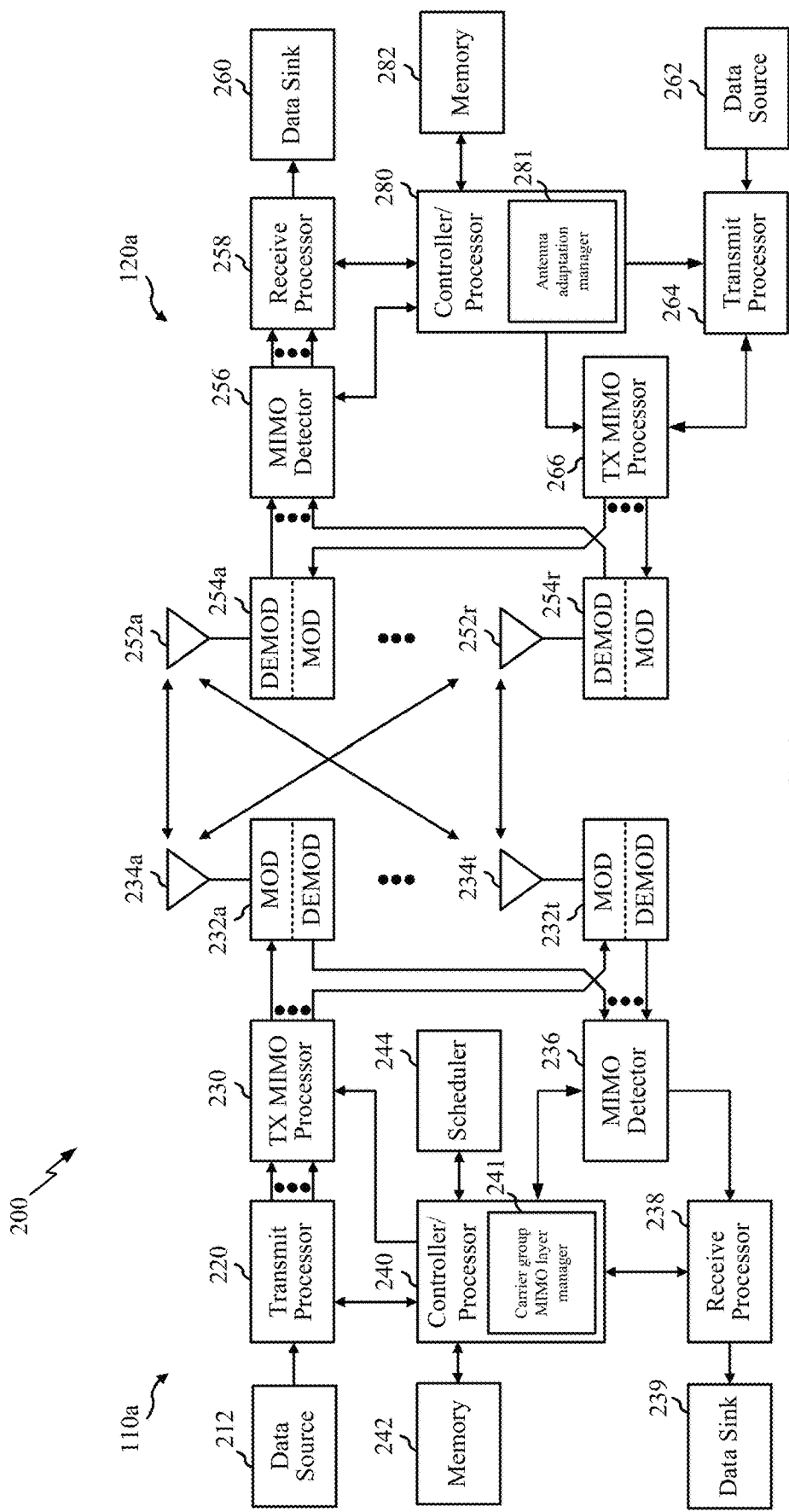
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS 110a may transmit a MAC CE to a UE 120a to put the UE 120a into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a carrier group MIMO layer manager 241 that may be configured to configure the UE 120a with carrier groups and associated set(s) of numbers of MIMO layers, in accordance with aspects of the present disclosure. As shown in FIG. 2, the controller/processor 280 of the UE 120a has an antenna adaptation manager 281 that may be configured to determine the number of MIMO layers to apply for a carrier group or groups and to active/deactivate antennas based on the determined number of MIMO layers, in accordance with aspects of the present disclosure. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
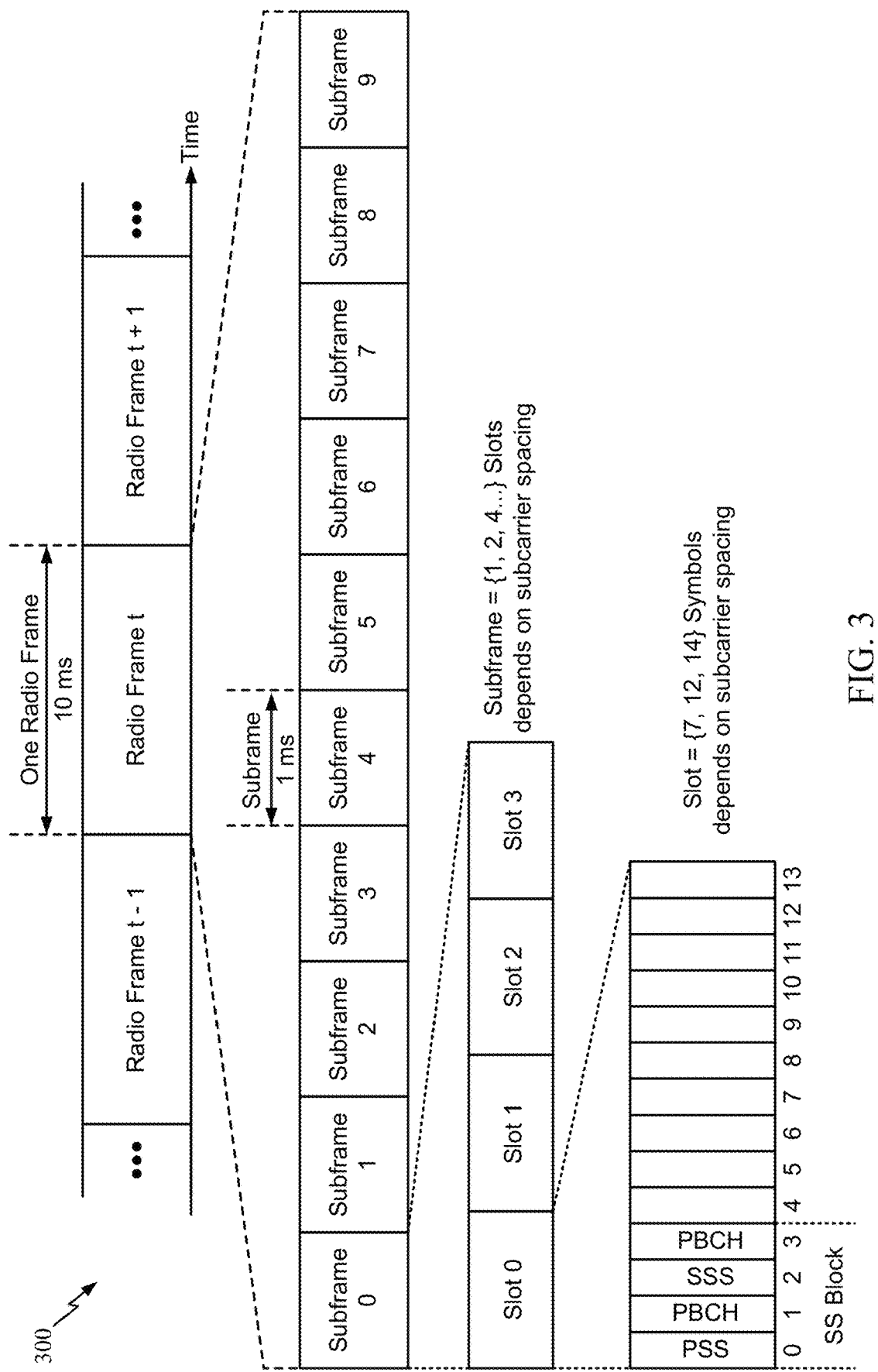
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As mentioned above, aspects of the present disclosure relate to carrier group based maximum multiple-input multiple-output (MIMO) layers and antenna adaptation.

Figure 4:
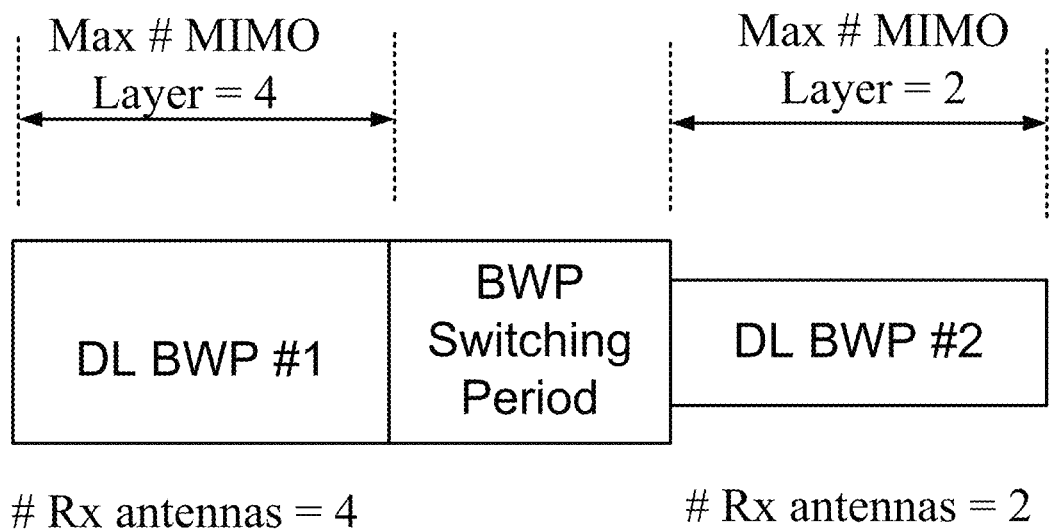
FIG. 4 shows an example of different configured numbers of multiple-input multiple-output (MIMO) layers for different bandwidth parts (BWPs).

In certain systems (e.g., 5G NR Release-15 and Rel-16 systems), UEs are configured with a number of MIMO layers per component carrier (CC) (such as in release 15) and/or per bandwidth part (BWP) (such as in Release 16). FIG. 4 shows BWP switching with different numbers of MIMO layers for the BWPs. BWPs in the same CC may assume the same number of MIMO layers. Thus, if the CC or BWP switches, the number of MIMO layers changes. The UE can save power by turning off some antennas (e.g., and associated baseband processing) when the UE switches to CCs or BWPs with a lower configured maximum number of MIMO layers. For example, in the example shown in FIG. 4, the UE is configured with the downlink (DL) BWP #1 that is configured with 4 layers (4 is the configured maximum number of MIMO layers) and the UE uses 4 antennas. As shown, the UE then switches to BWP #2 during the BWP switching period. The BWP #2 is configured with 2 layers (2 is the configured maximum number of MIMO layers). Thus, the UE can switch off two of its antennas (and associated baseband processing chains). Switching the antennas may save power at the UE.

In certain systems, however, such as carrier aggregation (CA) systems, the UE may have multiple (e.g., multiple active) CCs and/or BWPs. The multiple CCs and/or BWPs may be configured with independent (e.g., different) numbers of layers. Thus, the UE may not be able to active/deactivate antennas to utilize the power savings. In an example, such as in intra-band carrier aggregation, the UE shares the same radio frequency (RF) hardware (e.g., such as antennas, RF chains) across multiple CCs. If one CC has a configuration of four MIMO layers (e.g., max_MIMO_layer=4) while other CCs have a configuration of fewer MIMO layers (e.g., max_MIMO_layer<4), then the UE keeps four Rx antennas active even when using one of the CCs and/or BWPs configured with fewer than four MIMO layers.

Accordingly, what is needed are techniques and apparatus for antenna adaptation, even when the UE may be in CA operation with different numbers of configured MIMO layers.

Example Carrier Group Based MIMO Layers and Antenna Adaptation

Aspects of the present disclosure provide for carrier group based multiple-input multiple-output (MIMO) layers and antenna adaptation. In some examples, the configurations of the number of MIMO layers (e.g., maximum number of MIMO layers, max_MIMO_layers) is aligned across component carriers (CCs) in carrier aggregation (CA). \ Thus, the user equipment (UE) can achieve power saving through joint antenna adaptation, even in when the CCs have different numbers of configured MIMO layers.

According to certain aspects, the number of MIMO layers can be group-based. In some examples, the UE can be configured with groups of CCs. The UE can be configured with sets of configured numbers of MIMO layers (e.g., sets of max_MIMO_layer_values). Each value in each set corresponds to a CC in the group. Thus, each CC in each CC group is associated one with one or more multiple sets of numbers of MIMO layers. In this case, for each of the CCs in the carrier group, the UE knows (e.g., can determine) the associated configured numbers of MIMO layers (e.g., max_MIMO_layer value) for each of the CCs in the group.

FIG. 5 is a table 500 showing example configured sets of numbers of MIMO layers for a CC group, in accordance with certain aspects of the present disclosure. In the example shown in FIG. 5, the CCs 1, 2, 3, 4 are configured in a carrier group, and four sets of number of MIMO layers are configured for the CCs in the carrier group. In some examples, the CCs are configured with the same number of MIMO layers (e.g., as shown in set 1 and set 4) and/or with different numbers (e.g., as shown in set 2 and set 3). In some examples, all CCs in the group may be restricted to use the same number of MIMO layers, as shown in the table 600 in FIG. 6.

According to certain aspects, the CC grouping and the sets of numbers of MIMO layers configurations may be determined by the base station (e.g., a gNB). The BS may configure the UE with the groups of CCs and sets of numbers of MIMO layers configurations. In some examples, the BS semi-statically configures (e.g., via radio resource control (RRC) signaling) the carrier groups and the associated sets of numbers of MIMO layers. In some examples, the BS groups CCs in the same band (e.g., in intra-band CA) to the same group. In some examples, the configured group of CCs map to either FR1 band (e.g., sub 6-GHz) or FR2 band (e.g., 24.25 GHz-52.6 GHz). In some examples, the configured groups of CCs may be overlapping (e.g., including one or more of the same CCs). According to certain aspects, the UE may report a preferred configuration. For example, the UE may report preferred groupings of CCs. In some examples, the UE may report that the UE prefers that CCs from the same band are grouped. In some examples, the UE may report the preferred configuration as a UE capability and/or via UE assistance information feedback. In some examples, the gNB configures the groups based on the UE's preferred configuration.

According to certain aspects, the numbers of maximum MIMO layers configured across CCs in a group can be jointly adapted. In some examples, the BS can indicate a set index to the UE. When the UE is indicated with the set index (e.g., the index of the set of max_MIMO_layers), then the UE applies those values to corresponding CCs in the associated group of CCs. For example, referring back to the example configurations shown in the FIG. 5 and/or the FIG. 6, if the BS indicates the index of the set #1, then the UE can apply the number of MIMO layers=4 to the CCs 1, 2, 3, and 4 in the group.

According to certain aspects, when the UE is configured per-CC or per-BWP configured values for the numbers of maximum MIMO layers per-CC/BWP, the UE overrides (or ignores) the per-CC or per-BWP configured values with the carrier group based value when the BS indicates the carrier group set of numbers of MIMO layers.

According to certain aspects, the indication of the carrier group set of numbers of MIMO layers is provided by the BS via layer 1 (L1) signaling and/or layer 2 (L2) signaling. For example, indication of the carrier group set of numbers of MIMO layers may be provided via downlink control information (DCI) or medium access control (MAC) control element (CE) signaling. In some examples, the indication of the carrier group set of numbers of MIMO layers may be sent by the BS on any of the CCs in the associated group of CCs. In some examples, the indication of the carrier group set of numbers of MIMO layers may be sent by the BS on an anchor CC. The anchor CC may be configured per-CC group or an anchor CC may be configured for all of the CC groups. The anchor CC may be, or may be associated with, a primary cell (Pcell) or a secondary cell (Scell).

According to certain aspects, separate CC groups and sets of numbers of MIMO layers can be configured for UL MIMO and DL MIMO. In some examples, separate CC groups and set of numbers of MIMO layers can be configured for codebook-based UL MIMO and non-codebook based UL MIMO transmission (e.g., for PUSCH).

According to certain aspects, different sets of numbers of maximum MIMO layers for the CC groups can be associated with different BWPs, as shown in FIG. 7. In some examples, the numbers of MIMO layers configured across CCs in a group are jointly adapted by indicating the BWP index. For example, L1 BWP switching may be used to jointly adapt the number of MIMO layers configured across a group of CCs. As shown in FIG. 7, each configured BWP in each CC can have a per-BWP configuration of max_MIMO_layers. That is, in the example shown in FIG. 7, each of the BWPs 1, 2, 3, 4 is associated with a number of MIMO layers (e.g., max_MIMO_layers value) for each of the CCs 1, 2, 3, 4.

According to certain aspects, BWPs of the same index across CCs in the group may be bundled and switched in a synchronized manner. In some examples, BWP switching may be scheduled explicitly by DCI signaling. For example, the DCI may have a bitmap with a length equal to the number of BWPs.

In some examples, the BWP switching may be signaled (e.g., triggered) on any CC. In some examples, the BWP switching may be triggered only on an anchor CC. In some examples, the UE implicitly follows the anchor CC BWP.

Figure 8:
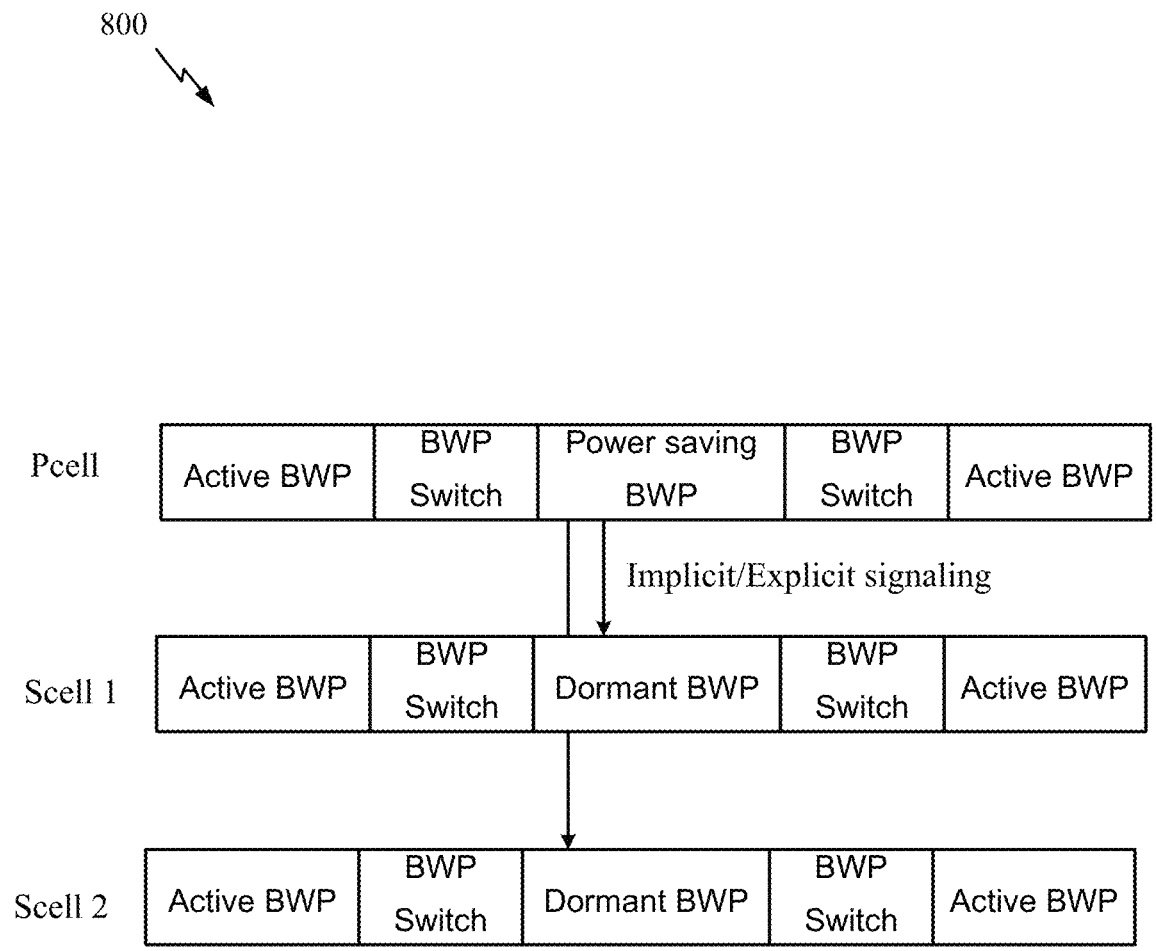
FIG. 8 shows BWP switching and configuring active and dormant BWPs on different CCs, in accordance with certain aspects of the present disclosure.

According to certain aspects, dormant BWPs of SCells can also be adapted (e.g., configured with a reduced number of maximum_MIMO_layers). Although there is no PDSCH reception during SCell dormancy, the CSI-RS configuration can also have fewer ports. This can save UE power consumption through reduced CSI-RS measurements/reporting of the SCells. The SRS configuration can also have fewer ports during BWP dormancy. As shown in FIG. 8, the dormant BWPs may follow the configured number of layers for the active BWP.

Figure 9:
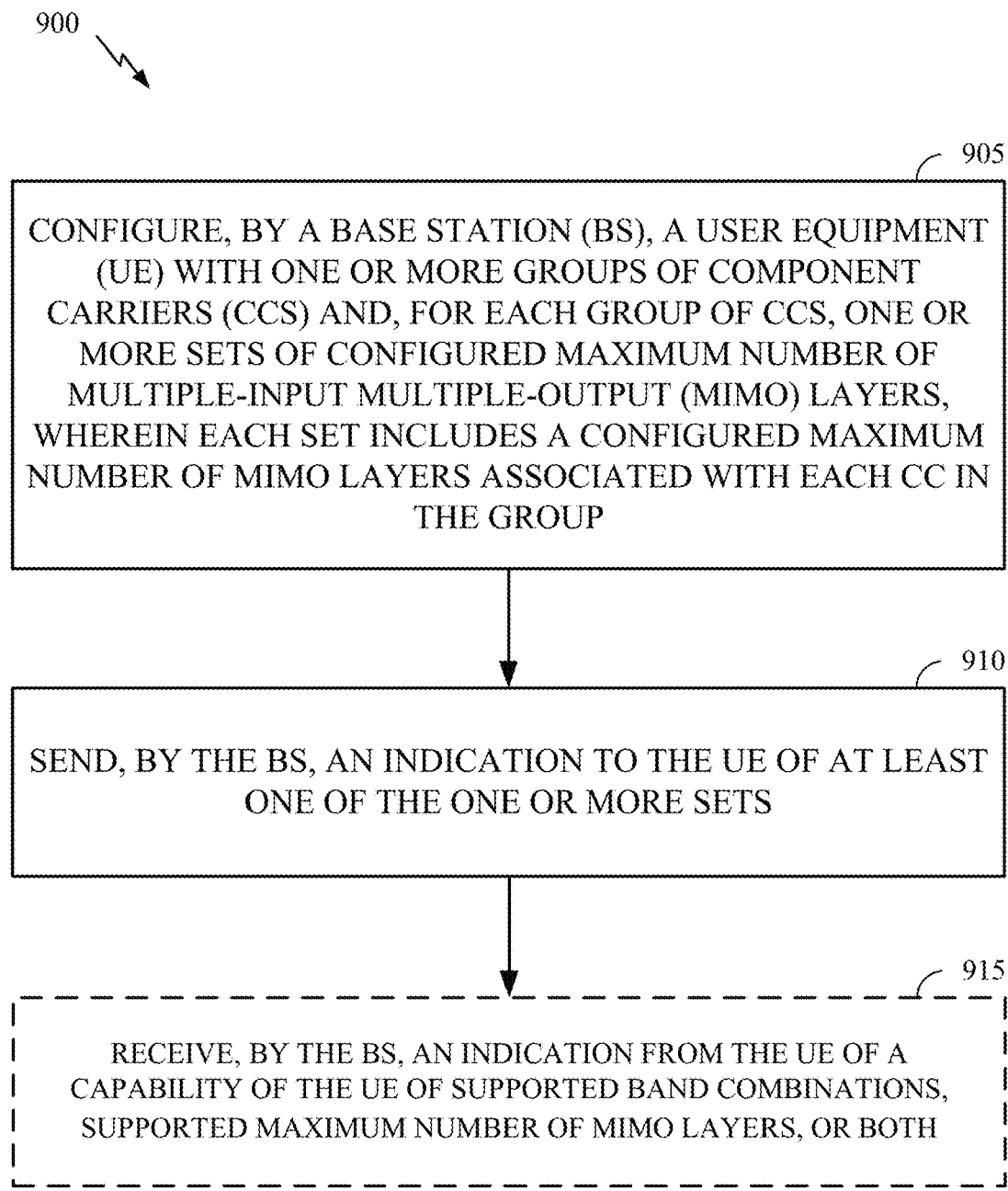
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110a in the wireless communication network 100). Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at 905, by configuring a UE with one or more groups of CCs and, for each group of CCs, one or more sets of configured maximum number of MIMO layers. Each set of configured maximum number of MIMO layers includes, for each CC in the group of CCs, a configured maximum number of MIMO layers associated that CC. In some examples, each set of configured maximum number of MIMO layers includes the same configured maximum number of MIMO layers associated with each CC in the group (e.g., as shown in FIG. 5). In some examples, one or more of the groups of CCs include CCs in a same band (e.g., as shown in FIG. 7). In some examples, at least two of the groups of CCs include one or more of the same CCs (e.g., as shown in FIG. 6). In some examples, the one or more groups and the associated one or more sets of configured maximum number of MIMO layers are configured via semi-static RRC signaling. In some examples, the BS receives an indication from the UE of one or more preferred groupings of CCs, and configures the one or more sets of configured maximum number of MIMO layers based on the indication. The indication from the UE of the one or more preferred groupings of CCs may be received as capability information or assistance information. In some examples, the BS configures one or more groups of CCs and one or more set of configured maximum number of MIMO layers for uplink and one or more groups of CCs and one or more set of configured maximum number of MIMO layers for downlink. In some examples, the BS configures one or more groups of CCs and one or more sets of configured maximum number of MIMO layers for codebook-based uplink MIMO and one or more groups of CCs and one or more sets of configured maximum number of MIMO layers for non-codebook-based uplink MIMO.

At 910, the BS sends an indication to the UE of at least one of the one or more sets of configured maximum number of MIMO layers. In some examples, the indication of the at least one set of configured maximum number of MIMO layers is provided via DCI or a MAC-CE. In some examples, the indication of the at least one set of configured maximum number of MIMO layers is provided on one of the CCs in the associated group of CCs. In some examples, the indication of the at least one set of configured maximum number of MIMO layers is provided on an anchor CC for the associated group of CCs or for all of the groups of CCs. In some examples, the BS sends another indication to the UE of a different set of configured maximum number of MIMO layers for the group of CCs to update the configured maximum number of MIMO layers associated with each CC in the group of CCs based on the indicated different set of configured maximum number of MIMO layers.

In some examples, each the one or more of configured maximum number of MIMO layers configured for a group of CCs is associated with a different BWP (e.g., as shown in FIG. 7). In this case, the BS provides an indication of a BWP to indicate the at least one set of configured maximum number of MIMO layers.

In some examples, at 915, the BS may receive an indication from the UE of a capability of the UE of supported band combination, supported maximum number of MIMO layers, or both.

Figure 10:
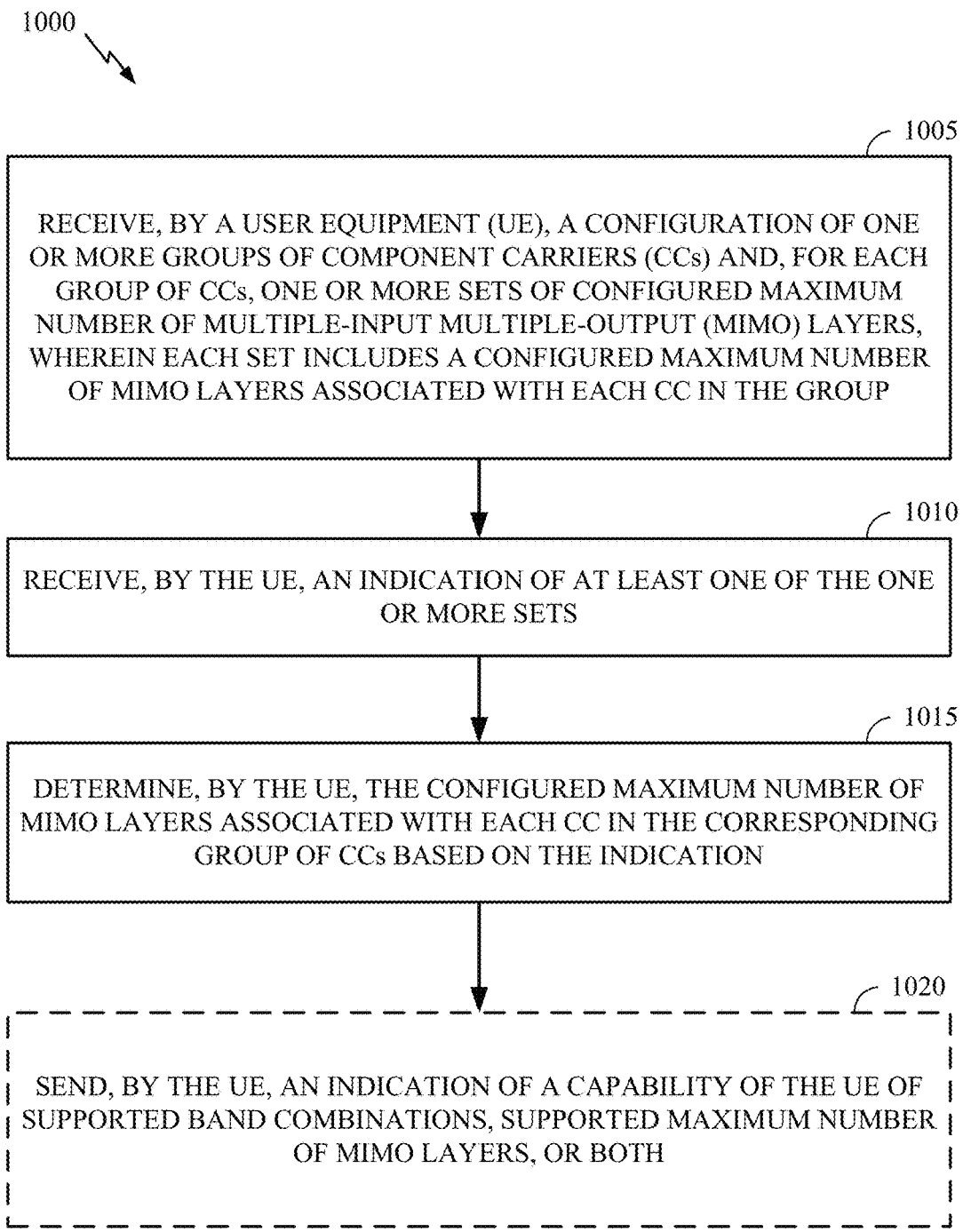
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by UE (e.g., such as a UE 120a in the wireless communication network 100). The operations 1000 may be complimentary operations by the UE to the operations 900 performed by the BS. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at 1005, by receiving a configuration of one or more groups of CCs and, for each group of CCs, one or more sets of configured maximum number of MIMO layers. Each set of configured maximum number of MIMO layers includes a configured maximum number of MIMO layers associated with each CC in the group.

In some examples, each set of configured maximum number of MIMO layers includes the same configured maximum number of MIMO layers associated with each CC in the group. In some examples, one or more of the groups of CCs comprises CCs in a same band. In some examples, at least two of the groups of CCs include one or more of the same CCs. In some examples, the one or more groups and the associated one or more sets are configured via semi-static radio RRC signaling. In some examples, the UE sends an indication of one or more preferred groupings of CCs, and the configuration is based on the indication. The indication may be provided as capability information or assistance information.

In some examples, the configuration includes one or more groups of CCs and one or more set of configured maximum number of MIMO layers for uplink, and one or more groups of CCs and one or more sets of configured maximum number of MIMO layers for downlink. In some examples, the configuration includes one or more groups of CCs and one or more set of configured maximum number of MIMO layers for codebook-based uplink MIMO, and one or more groups of CCs and one or more set of configured maximum number of MIMO layers for non-codebook-based uplink MIMO.

At 1010, the UE receives an indication of at least one of the one or more sets of configured maximum number of MIMO layers. In some examples, the indication of the at least one set of configured maximum number of MIMO layers is received via DCI or a MAC-CE. In some examples, the indication of the at least one set of configured maximum number of MIMO layers is received on one of the CCs in the associated group of CCs. In some examples, the indication of the at least one set of configured maximum number of MIMO layers is received on an anchor CC for the associated group of CCs or for all of the groups of CCs.

According to certain aspects, each of the one or more of configured maximum number of MIMO layers configured for a group of CCs may be associated with a different BWP. In this case, the UE receives an indication of a BWP indicating the at least one set.

At 1015, the UE determines the configured maximum number of MIMO layers associated with each CC in the corresponding group of CCs based on the indication. In some examples, the UE receives a configuration of maximum numbers of MIMO layers per-CC or per-BWP and ignores the configured maximum numbers of MIMO layers per-CC or per-BWP when determining the maximum number of layers associated with each CC in the corresponding group of CCs According to certain aspects, the UE activates or deactivates one or more UE antennas based on the determined maximum number of MIMO layers associated with the CCs in the group.

According to certain aspects, the UE receives another indication of a different set for the group of CCs and updates the configured maximum number of MIMO layers associated with each CC in the group of CCs based on the indicated different set.

According to certain aspects, the UE applies the configured maximum number of MIMO layers for the indicated BWP to one or more dormant BWPs for the secondary cells.

In some examples, at 1020, the UE may send an indication to the BS of a capability of the UE of supported band combinations, supported maximum number of MIMO layers, or both.

Figure 11:
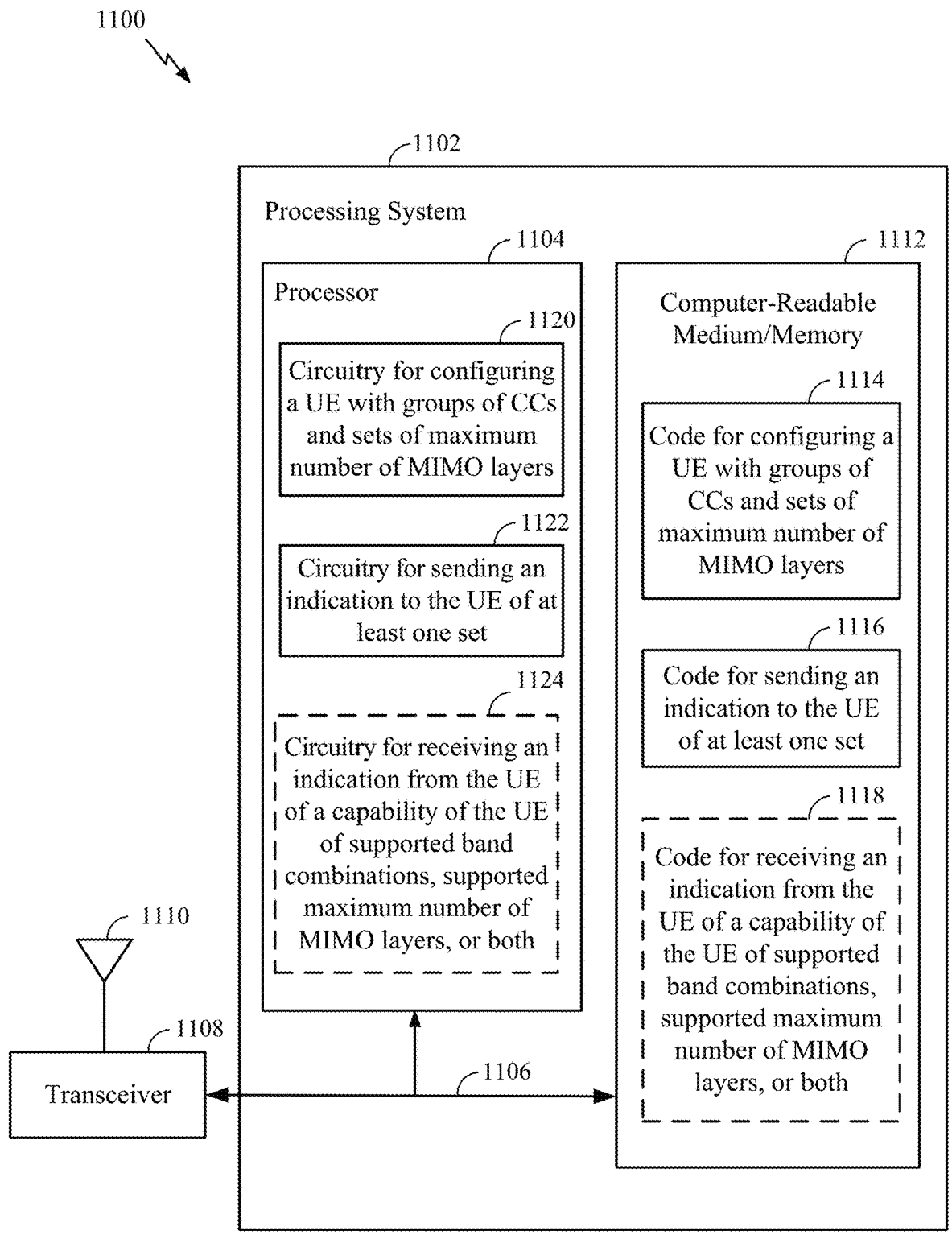
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for carrier group based MIMO layers and antenna adaptation. In certain aspects, computer-readable medium/memory 1112 stores code 1114 for configuring a UE with groups of CCs and sets of maximum numbers of MIMO layers; code 1116 for sending an indication to the UE of at least one set; and/or code 1118 for receiving an indication from the UE of a capability of the UE of supported band combination, supported maximum number of MIMO layers, or both, in accordance with aspects of the present disclosure. In certain aspects, the processor 1104 has circuitry configured to implement the code stored in the computer-readable medium/memory 1112. The processor 1104 includes circuitry 1120 for configuring a UE with groups of CCs and sets of maximum numbers of MIMO layers; circuitry 1122 for sending an indication to the UE of at least one set; and/or circuitry 1124 for receiving an indication from the UE of a capability of the UE of supported band combination, supported maximum number of MIMO layers, or both, in accordance with aspects of the present disclosure.

Figure 12:
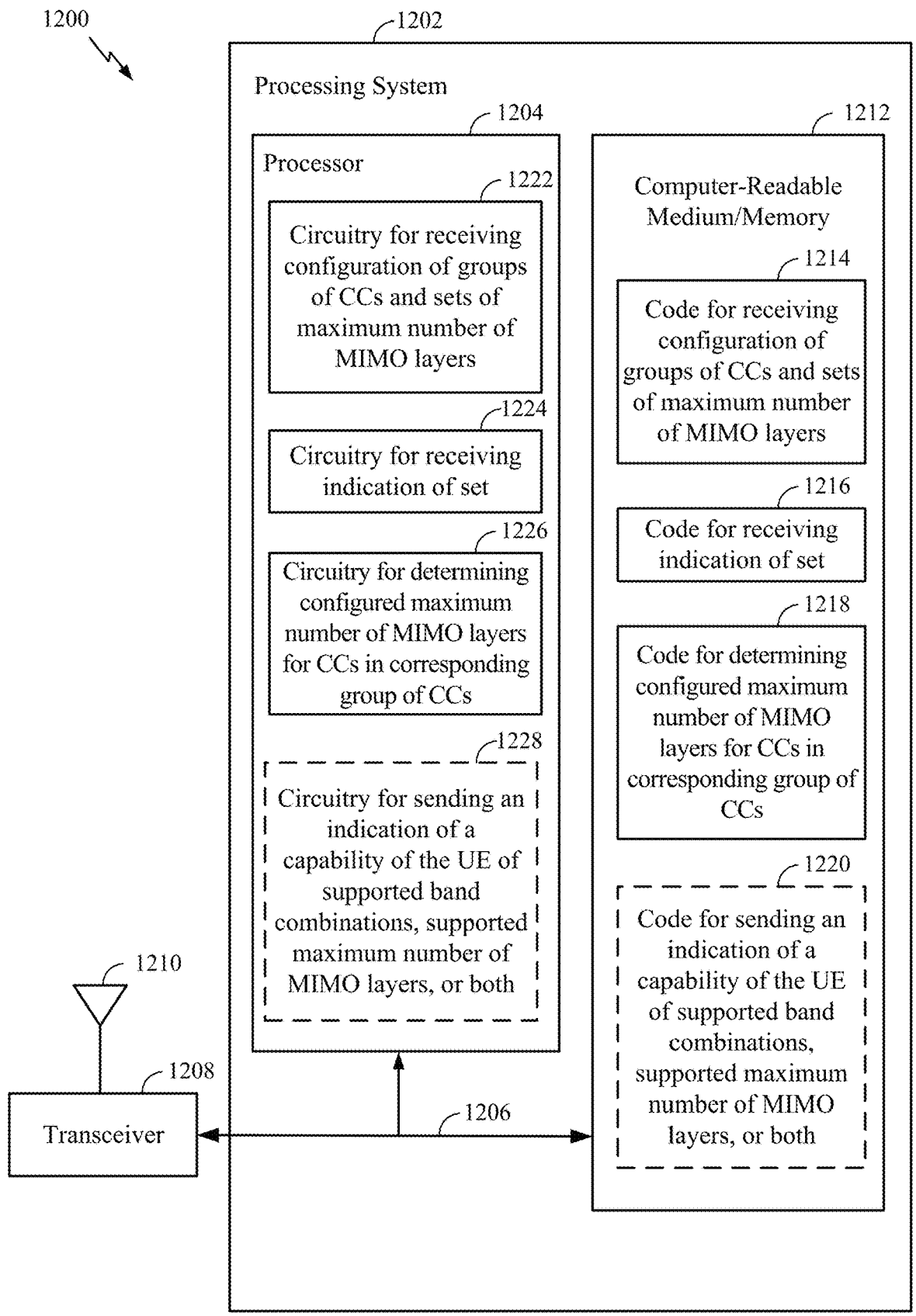
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for carrier group based MIMO layers and antenna adaptation. In certain aspects, computer-readable medium/memory 1212 stores code 1214 for receiving a configuration of groups of CCs and sets of maximum number of MIMO layers; code 1216 for receiving an indication of at least one set; code 1218 for determining configured maximum numbers of MIMO layers for CCs in the corresponding group of CCs; and/or code 1220 for sending an indication to the BS of a capability of the UE of supported band combinations, supported maximum number of MIMO layers, or both in accordance with aspects of the present disclosure. In certain aspects, the processor 1204 has circuitry configured to implement the code stored in the computer-readable medium/memory 1212. The processor 1204 includes circuitry 1222 for receiving a configuration of groups of CCs and sets of maximum number of MIMO layers; circuitry 1224 for receiving an indication of at least one set; circuitry 1226 for determining configured maximum numbers of MIMO layers for CCs in the corresponding group of CCs; and/or circuitry 1228 for sending an indication to the BS of a capability of the UE of supported band combinations, supported maximum number of MIMO layers, or both in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
 receiving a configuration of a plurality of sets of maximum number of multiple-input multiple-output (MIMO) layers, wherein each set of the plurality of sets of maximum number of MIMO layers includes a configured maximum number of MIMO layers associated with each component carrier (CC) in a group of a plurality of CCs, wherein the plurality of sets of maximum number of MIMO layers include different maximum numbers of MIMO layers associated with the CCs in the group of the plurality of CCs, and wherein each set is associated with an index value;
 receiving signaling, from a network entity, comprising an indication of the index value of one set of the plurality of sets of maximum number of MIMO layers to use for the group of the plurality of CCs; and
 determining the maximum number of MIMO layers to use for each CC in the group of the plurality of CCs based on the indication.

2. The method of claim 1, further comprising activating or deactivating one or more UE antennas based on the determined maximum number of MIMO layers to use for each CC in the group of the plurality of CCs.

3. The method of claim 1, wherein each set of the plurality of sets of maximum number of MIMO layers includes a single configured maximum number of MIMO layers for the group of the plurality of CCs.

4. The method of claim 1, wherein the group of the plurality of CCs comprises CCs in a same frequency band.

5. The method of claim 1, further comprising receiving a configuration of a second group of a second plurality of CCs, wherein the second group of the second plurality CCs includes one or more CCs of the plurality of CCs.

6. The method of claim 1, wherein the configuration of the group of the plurality of CCs and the plurality of sets of maximum number of MIMO layers are received via semi-static radio resource control (RRC) signaling.

7. The method of claim 1, further comprising sending a second indication of one or more preferred groupings of CCs, one or more preferred sets of maximum number of MIMO layers, or a combination thereof.

8. The method of claim 7, wherein the second indication is sent as UE capability information or as assistance information.

9. The method of claim 1, further comprising:
receiving a configuration of maximum number of MIMO layers at least one of per-CC or per-bandwidth part (BWP) for the plurality of CCs; and
overriding the configured maximum numbers of MIMO layers at least one of per-CC or per-BWP with the determined the maximum number of layers to use for each CC in the group of the plurality of CCs based on the indication.

10. The method of claim 1, wherein the indication of the one set of the plurality of sets of maximum number of MIMO layers is received via downlink control information (DCI) or a medium access control control element (MAC-CE).

11. The method of claim 1, wherein the indication of the one set of the plurality of sets of maximum number of MIMO layers to use for the group of the plurality of CCs is received on a CC of the plurality of CCs.

12. The method of claim 1, wherein the indication of the one set of the plurality of sets of maximum number of MIMO layers to use for the group of the plurality of CCs is received on an anchor CC for the group of the plurality of CCs or an anchor CC for all of the groups of CCs.

13. The method of claim 1, wherein the configuration comprises:
a first one or more groups of CCs and, for each of the first one or more groups of CCs, a first plurality of sets of maximum number of MIMO layers for uplink; and
a second one or more groups of CCs and, for each of the second one or more groups of CCs, a second plurality of sets of maximum number of MIMO layers for downlink.

14. The method of claim 1, wherein the configuration comprises:
a first one or more groups of CCs and, for each of the first one or more groups of CCs, a first plurality of sets of maximum number of MIMO layers for codebook-based uplink MIMO; and
a second one or more groups of CCs and, for each of the second one or more groups of CCs, a second plurality of sets of maximum number of MIMO layers for non-codebook-based uplink MIMO.

15. The method of claim 1, further comprising:
receiving a second indication of a second set of the plurality of sets of maximum number of MIMO layers to use for the group of the plurality of CCs; and
updating the maximum number of MIMO layers to use for each CC in the group of the plurality of CCs based on the second indication.

16. The method of claim 1, wherein:
each set of the plurality of sets of maximum number of MIMO layers is associated with a different bandwidth part (BWP); and
receiving the indication of the index value of the one set of the plurality of sets of maximum number of MIMO layers to use for the group of the plurality of CCs comprises receiving an indication of the BWP associated with the one set.

17. The method of claim 16, further comprising applying the one set of maximum number of MIMO layers to one or more dormant BWPs for one or more secondary cells.

18. The method of claim 1, further comprising:
using the one set of the plurality of sets of maximum number of MIMO layers to determine one or more UE receive antennas, a number of ports, or both to use for transmitting a reference signal (RS), transmitting a sounding reference signal (SRS), receiving a channel state information reference signal (CSI-RS), or a combination thereof.

19. The method of claim 1, further comprising:
sending an indication of a capability of the UE of supported band combinations, supported maximum number of MIMO layers per-band, supported maximum number of MIMO layers per band combination, or a combination thereof.

20. The method of claim 1, wherein at least one set of the plurality of sets of maximum number of MIMO layers includes different configured maximum number of MIMO layers for different CCs in the group of the plurality of CCs.

21. A method for wireless communications by a network entity, comprising:
configuring a user equipment (UE) with a plurality of sets of maximum number of multiple-input multiple-output (MIMO) layers, wherein each set of the plurality of sets of maximum number of MIMO layers includes a configured maximum number of MIMO layers associated with each component carrier (CC) in a group of a plurality of CCs, wherein the plurality of sets of maximum number of MIMO layers include different maximum numbers of MIMO layers associated with the CCs in the group of the plurality of CCs, and wherein each set is associated with an index value; and
outputting an indication, for signaling to the UE, of the index value of one set of the plurality of sets of maximum number of MIMO layers to use for the group of the plurality of CCs.

22. The method of claim 21, wherein each set of the plurality of sets of maximum number of MIMO layers includes a single configured maximum number of MIMO layers for the group of the plurality of CCs.

23. The method of claim 21, wherein the group of the plurality of CCs comprises CCs in a same frequency band.

24. The method of claim 21, further comprising configuring the UE with a second group of a second plurality of CCs, and wherein the second plurality of CCs includes one or more of the plurality of CCs.

25. The method of claim 21, wherein the configuration of the group of the plurality of CCs and the plurality of sets of maximum number of MIMO layers are configured via semi-static radio resource control (RRC) signaling.

26. The method of claim 21, further comprising receiving an indication from the UE of one or more preferred groupings of CCs, one or more preferred sets of maximum number of MIMO layers, or a combination thereof.

27. The method of claim 26, wherein the indication is received as UE capability information or as assistance information.

28. The method of claim 21, wherein the indication of the one set of the plurality of sets of maximum number of MIMO layers is sent via downlink control information (DCI) or a medium access control control element (MAC-CE).

29. The method of claim 21, wherein the indication of the one set of the plurality of sets of maximum number of MIMO layers to use for the group of the plurality of CCs is provided on one CC of the plurality of CCs.

30. An apparatus for wireless communications, comprising:
- at least one processor; and
- a memory coupled to the at least one processor, the memory comprising code executable by the at least one processor to cause the apparatus to:
  - receive a configuration of a plurality of sets of maximum number of multiple-input multiple-output (MIMO) layers, wherein each set of the plurality of sets of maximum number of MIMO layers includes a configured maximum number of MIMO layers associated with each component carrier (CC) in a group of a plurality of CCs, wherein the plurality of sets of maximum number of MIMO layers include different maximum numbers of MIMO layers associated with the CCs in the group of the plurality of CCs, and wherein each set is associated with an index value;
  - receive signaling, from a network entity, comprising an indication of the index value of one set of the plurality of sets of maximum number of MIMO layers to use for the group of the plurality of CCs; and
  - determine the maximum number of MIMO layers to use for each CC in the group of the plurality of CCs based on the indication.

31. An apparatus for wireless communications, comprising:
- at least one processor; and
- a memory coupled to the at least one processor, the memory comprising code executable by the at least one processor to cause the apparatus to:
  - configure a user equipment (UE) with a plurality of sets of maximum number of multiple-input multiple-output (MIMO) layers, wherein each set of the plurality of sets of maximum number of MIMO layers includes a configured maximum number of MIMO layers associated with each component carrier (CC) in a group of a plurality of CCs, wherein the plurality of sets of maximum number of MIMO layers include different maximum numbers of MIMO layers associated with the CCs in the group of the plurality of CCs, and wherein each set is associated with an index value; and
  - output an indication, for signaling to the UE, of the index value of one set of the plurality of sets of maximum number of MIMO layers to use for the group of the plurality of CCs.

* * * * *